United States Patent
Fransson et al.

(10) Patent No.: US 9,025,874 B2
(45) Date of Patent: May 5, 2015

(54) METHOD AND SYSTEM FOR GENERATING SHALLOW DEPTH OF FIELD EFFECT

(71) Applicant: Research In Motion Limited, Waterloo (CA)

(72) Inventors: Johan Nils Fransson, Waterloo (CA); Sung Ho Hong, Waterloo (CA)

(73) Assignee: BlackBerry Limited, Waterloo (CA)

( * ) Notice: Subject to any disclaimer, the term of this patent is extended or adjusted under 35 U.S.C. 154(b) by 128 days.

(21) Appl. No.: 13/770,034

(22) Filed: Feb. 19, 2013

(65) Prior Publication Data
US 2014/0233853 A1    Aug. 21, 2014

(51) Int. Cl.
| | |
|---|---|
| G06K 9/34 | (2006.01) |
| G06K 9/54 | (2006.01) |
| G06K 9/60 | (2006.01) |
| G06T 7/00 | (2006.01) |
| H04N 5/232 | (2006.01) |

(52) U.S. Cl.
CPC .............. *G06K 9/60* (2013.01); *H04N 5/23212* (2013.01); *G06T 7/0081* (2013.01); *G06T 7/0083* (2013.01); *G06T 7/0069* (2013.01)

(58) Field of Classification Search
CPC ..... G06T 7/0081; G06T 7/0083; G06T 5/001; G06T 7/0069; H04N 5/23212; G06K 9/60
USPC .......................... 382/173, 264, 305, 312, 255; 348/208.99, 239
See application file for complete search history.

(56) References Cited

U.S. PATENT DOCUMENTS

| | | | |
|---|---|---|---|
| 5,452,047 A * | 9/1995 | Fujii et al. ...................... | 396/133 |
| 7,302,096 B2 | 11/2007 | Kim | |
| 8,194,158 B2 * | 6/2012 | Watanabe ....................... | 348/248 |
| 8,416,338 B2 * | 4/2013 | Nagasaka et al. .............. | 348/348 |
| 8,681,245 B2 * | 3/2014 | Lee ................................ | 348/239 |
| 2009/0028390 A1 | 1/2009 | Hayaishi | |
| 2010/0328477 A1 | 12/2010 | Watanabe | |
| 2011/0069884 A1 | 3/2011 | Zhang et al. | |
| 2011/0122287 A1 | 5/2011 | Kunishige et al. | |
| 2011/0280475 A1 | 11/2011 | Singhal et al. | |
| 2012/0229674 A1 | 9/2012 | Solomon | |
| 2012/0320239 A1 | 12/2012 | Uehara | |
| 2013/0033582 A1 | 2/2013 | Sun et al. | |

FOREIGN PATENT DOCUMENTS

| | | |
|---|---|---|
| EP | 1954031 A1 | 8/2008 |
| EP | 1171996 B2 | 7/2010 |
| WO | 2007071918 A1 | 6/2007 |

OTHER PUBLICATIONS

European Patent Office, "Extended European Search Report" for European Patent Application No. 13155716.7 dated Jul. 19, 2013, Germany.
Soonmin Bae et al., "Defocus Magnification", Computer Graphics Forum, vol. 26, No. 3, Sep. 1, 2007, pp. 571-579, sections 1 and 2.

\* cited by examiner

*Primary Examiner* — Kanjibhai Patel
(74) *Attorney, Agent, or Firm* — Ridout & Maybee LLP

(57) ABSTRACT

Methods and systems for generating a shallow depth of field effect for a digitally captured image are provided. At least one region of interest (ROI) and at least one non-interest region are defined in the captured image. A difference in focus or object distance is calculated between the ROI and each non-interest region. A degree of blur is applied to each non-interest region, based on the calculated difference in focus or object distance.

20 Claims, 4 Drawing Sheets

METHOD AND SYSTEM FOR GENERATING SHALLOW DEPTH OF FIELD EFFECT

TECHNICAL FIELD

The present disclosure relates to digital cameras, including methods and systems for generating a shallow depth of field effect.

BACKGROUND

Digital cameras, including digital cameras built into smartphones and other multipurpose portable electronic devices, may not have an f-number (that is, the ratio of the lens focal length to the diameter of the entrance pupil) appropriate to produce a sufficiently shallow depth of field, which may be desirable in photography. It may be useful to provide a way to artificially generate a shallow depth of field effect without relying on the digital camera's inherent capabilities.

DETAILED DESCRIPTION

Figure 1:
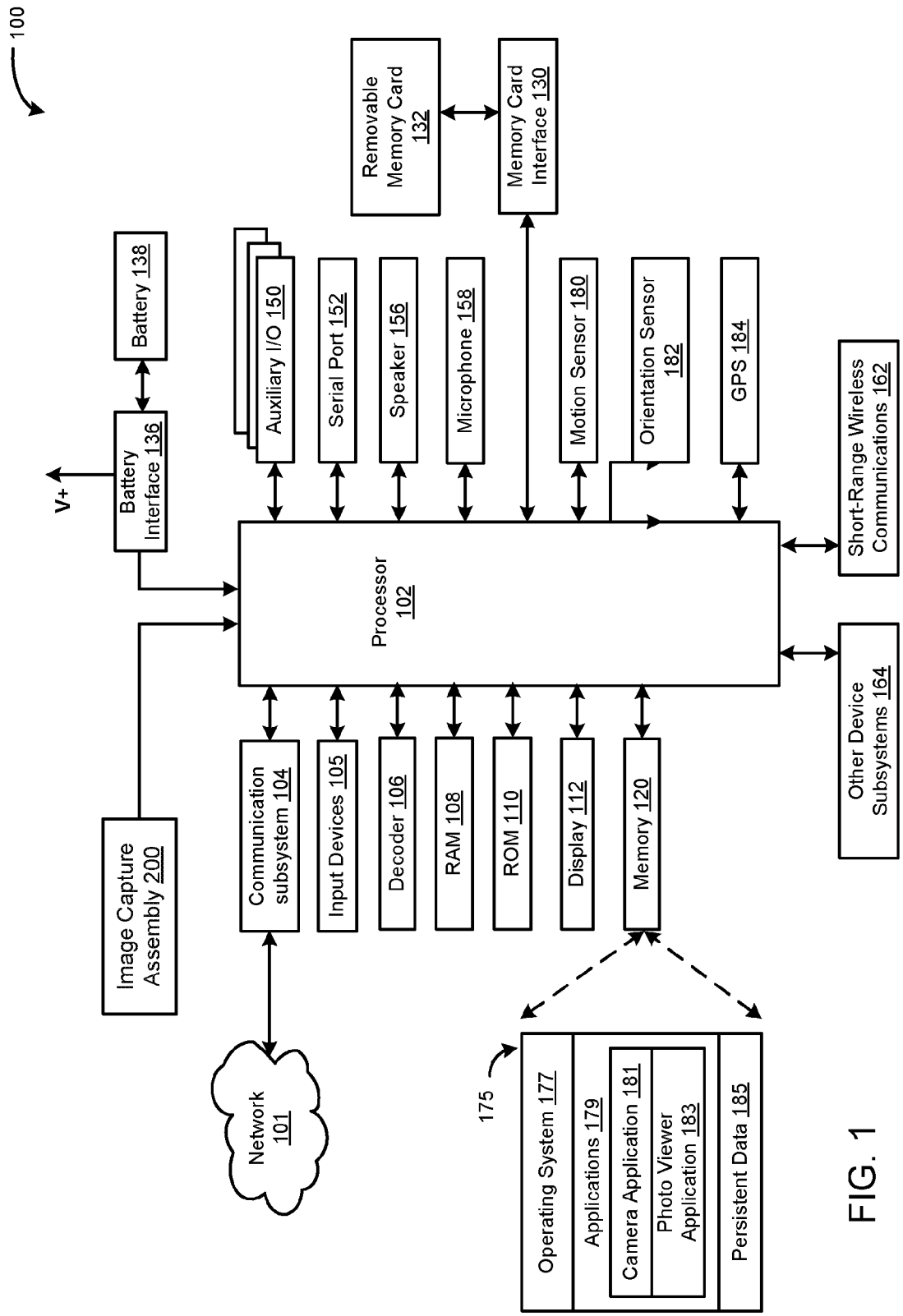
FIG. 1 is a block diagram illustrating a portable electronic device suitable for carrying out example embodiments of the present disclosure.

Reference will now be made to the accompanying drawings which show example embodiments of the present disclosure. For simplicity and clarity of illustration, reference numerals may be repeated among the figures to indicate corresponding or analogous elements. Numerous details are set forth to provide an understanding of the example embodiments described herein. The example embodiments may be practiced without some of these details. In other instances, suitable variations in methods, procedures, and components have not been described in detail to avoid obscuring the example embodiments described. The present disclosure is not to be considered as limited to the scope of the example embodiments described herein.

Any reference to direction or orientation stated herein is for convenience and is not intended to be limiting unless explicitly stated herein. Any directional references in relation to the graphical user interface (GUI) may be defined relative to the screen orientation of the GUI rather than a fixed point or reference on the host electronic device. The term "user interface" is sometimes used herein to refer to the GUI for convenience. For the purpose of the present disclosure, the terms device orientation and device position are treated equivalently.

The present disclosure provides methods, systems and products suitable for generating a shallow depth of field effect in digitally captured images.

In some example aspects, the present disclosure provides a method for generating a shallow depth of field effect for a digitally captured image, at least one region of interest and at least one non-interest region being defined in the captured image, the method may include: calculating, for each non-interest region, a difference in focus or object distance between the at least one region of interest and the non-interest region; determining, for each non-interest region, a degree of blur to be applied to the non-interest region, based on the calculated difference in focus or object distance; applying the determined degree of blur to each non-interest region, to generate a blurred image; and displaying the blurred image on a display.

In some example aspects, the present disclosure provides an electronic device for generating a shallow depth of field effect for a digitally captured image, at least one region of interest and at least one non-interest region being defined in the captured image, where the electronic device may include a processor configured to execute computer-readable instructions to cause the electronic device to: calculate, for each non-interest region, a difference in focus or object distance between the at least one region of interest and the non-interest region; determine, for each non-interest region, a degree of blur to be applied to the non-interest region, based on the calculated difference in focus or object distance; apply the determined degree of blur to each non-interest region, to generate a blurred image; and display the blurred image on a display.

In some example aspects, the present disclosure may provide a non-transient computer readable medium for generating a shallow depth of field effect for a digitally captured image, at least one region of interest and at least one non-interest region being defined in the captured image, the computer readable medium storing computer-readable instructions that are executable to cause an electronic device to: calculate, for each non-interest region, a difference in focus or object distance between the at least one region of interest and the non-interest region; determine, for each non-interest region, a degree of blur to be applied to the non-interest region, based on the calculated difference in focus or object distance; apply the determined degree of blur to each non-interest region, to generate a blurred image; and display the blurred image on a display.

FIG. 1 illustrates a portable electronic device 100 (referred to hereinafter as merely electronic device 100 for convenience) in which example embodiments described in the present disclosure can be applied. The electronic device 100 described below may include wireless communication capabilities; however, it is contemplated that the teachings of the present disclosure may be applied to devices without wireless communication capabilities. Examples of the electronic device 100 include, but are not limited to, a mobile phone, a smartphone or superphone, a tablet computer, a notebook computer (also known as a laptop, netbook or ultrabook computer depending on the device capabilities), a wireless organizer, a personal digital assistant (PDA), an electronic gaming device, and a special purpose digital camera (which may be capable of both still image and video image capture).

The electronic device 100 may include a rigid case (not shown) housing the electronic components of the electronic device 100. The electronic components of the electronic device 100 may be mounted on a printed circuit board (not shown). The electronic device 100 may include a controller comprising at least one processor 102 (such as a microprocessor) which may control the overall operation of the electronic device 100. Communication functions, including data and voice communications, may be performed through a communication subsystem 104. Data received by the electronic device 100 may be decompressed and decrypted by a decoder 106. The communication subsystem 104 may receive messages from and send messages to a wireless network 101. The wireless network 101 may be any suitable type of wireless network.

The processor 102 may interact with one or more other components, such as one or more input devices 105; one or more Random Access Memories (RAM) 108; one or more Read Only Memories (ROM) 110; one or more displays 112 such as a color liquid crystal display (LCD); one or more persistent (non-volatile) memories 120 which may include a flash erasable programmable read only memory (EPROM) memory ("flash memory") or any other suitable form of memory; one or more image capture assemblies 200; one or more motion sensors 180 which may provide information to enable the processor 102 to determine whether the electronic device 100 is in motion and/or the nature of any sensed motion at any appropriate time, e.g., when an image is captured; one or more orientation sensors 182 which may provide information to enable the processor 102 to determine which direction the electronic device 100 is pointed at any appropriate time, e.g., when an image is captured; one or more global positioning system (GPS) devices 184 which may provide information to enable the processor 102 to determine GPS coordinates (which may be indicative of location) of the electronic device 100 at any appropriate time, e.g., when an image is captured; one or more auxiliary input/output (I/O) subsystems 150, data port 152 such as serial data port (e.g., Universal Serial Bus (USB) data port), speaker 156, microphone 158, short-range communication subsystem 162; and other device subsystems generally designated as 164. The components of the electronic device 100 may be coupled via a communications bus (not shown) which may provide a communication path between the various components.

The display 112 typically includes a display area in which information may be displayed and a non-display area extending around the periphery of the display area. Information may not be displayed in the non-display area. The non-display area may be utilized to accommodate, for example, electronic traces or electrical connections, adhesives or other sealants, and/or protective coatings around the edges of the display area.

The display 112 may be provided as part of a touch-sensitive display which may also serve as an input device 105. For example, the display 112 may be provided together with a touch-sensitive overlay (not shown) operably coupled to an electronic controller (not shown) to provide the touch-sensitive display. The touch-sensitive display may be a capacitive touch-sensitive display which may include a capacitive touch-sensitive overlay. The touch-sensitive display may be any other suitable touch-sensitive display, such as a resistive, infrared, surface acoustic wave (SAW) touch-sensitive display, strain gauge, optical imaging, dispersive signal technology, acoustic pulse recognition, or any other suitable touch-sensitive display. The overlay of the touch-sensitive display may be an assembly of multiple layers in a stack which may include, for example, a substrate, a ground shield layer, a barrier layer, one or more capacitive touch sensor layers separated by a substrate or other barrier, and/or a cover. The capacitive touch sensor layers may be any suitable material, such as patterned indium tin oxide (ITO).

User-interaction with the GUI may be performed through the input device(s) 105. Information, such as text, characters, symbols, images, icons, and other items may be rendered and displayed on the display 112 via the processor 102. The processor 102 may interact with the orientation sensor 182 to detect, for example, direction of gravitational forces or gravity-induced reaction forces so as to determine, for example, the orientation of the electronic device 100 in order to determine a screen orientation for the GUI.

The input device(s) 105 may include one or more of: a keyboard, control buttons such as a power toggle (on/off) button (not shown), a camera button (not shown) for enabling a camera mode, a capture button (not shown) for enabling an image capture sequence when in the camera mode, one or more focusing buttons (not shown) for adjusting the focus manually and/or automatically, one or more zoom buttons (not shown) for enabling a selection of a zoom setting when in the camera mode, and a navigation device (not shown) for navigating through stored data, such as digital images, menu choices and the like which may be displayed on the display 112. When the display 112 is provided as part of a touch-sensitive display, the capture button, focus button(s), zoom button(s) and/or other camera controls may be provided by onscreen user interface elements displayed on the display 112 instead of, or in addition to, physical interface components. Where one or more such buttons are provided by onscreen user interface element(s), the term "button" may be used in the present disclosure to refer to such non-physical interface elements. The keyboard may be provided instead of, or in addition to, a touch-sensitive display depending on the embodiment. In some examples, at least one of the control buttons may a multipurpose button rather than special purpose or dedicated buttons.

The electronic device 100 may include a memory card interface 130 for receiving a removable memory card 132 comprising persistent memory, such as flash memory. A removable memory card 132 may be inserted in and/or coupled to the memory card interface 130 for storing and/or reading data by the processor 102 including, but not limited to still images and/or video images captured by the image capture assembly 200. Other types of user data may also be stored on the removable memory card 132. Other types of removable digital image storage media, such as magnetic hard drives, magnetic tape, and/or optical disks, may be used in addition to, or instead of, the removable memory card 132.

The processor 102 may operate under stored program control and may execute one or more software modules 175 stored in memory, for example, in the persistent memory 120. In the example shown in FIG. 1, the software modules 175 include operating system software 177 and one or more software applications 179. The software applications 179 in this example may include a camera application 181 and a photo viewer application 183. The camera application 181 may include instructions executable by the processor 102 for operating the image capture assembly 200 and/or capturing still images and optionally video images from the image capture assembly 200 and/or storing the still images and optionally video images in memory (e.g., the persistent memory 120). The photo viewer application 183 may include instructions executable by the processor 102 for displaying data (e.g., still images and optionally video images) from memory (e.g., the persistent memory 120) and/or data from the image capture assembly 200 on the display 112. Persistent data 185, such as user data, can also be stored in memory (e.g., the persistent memory 120). The persistent data 185 may include digital media files stored in the electronic device 100 such as still images and/or video images captured by the image capture assembly 200, or other still images and/or video images transferred, downloaded or otherwise stored in memory.

The software modules 175 or parts thereof may be temporarily loaded into volatile memory such as the RAM 108. Volatile memory (e.g., the RAM 108) may be used for storing runtime data variables and/or other types of data or information. Although specific functions have been described for various types of memory, this is merely an example, and a different assignment of functions to types of memory could also be used.

Still images and optionally video images captured by the image capture assembly 200 may be stored in persistent memory. The persistent memory may be one or any combination of the internal persistent memory 120, the removable memory card 132 or remote persistent storage. The remote persistent storage may be a cloud based resource, such as a remote content server, accessible by the wireless network 101 or possibly via a wireline (e.g., via the data port 152) or short-range wireless connection (e.g., via the short-range communication subsystem 162) to a host computer having wireline access to the cloud based resource. The location at which captured still images and optionally video images are to be stored may be a configurable setting which may be set by a user either in advance or at the time of capture.

The camera application 181 and/or photo viewer application 183 may be able to access the remote persistent storage and optionally cloud-based applications through, for example, the wireless network 101 or via a wireline or short-range wireless connection to a host computer having wireline access to the cloud based resource. The use of cloud-based or other remote persistent storage may allow access to still images and optionally video images captured by the image capture assembly 200 from a computer or portable electronic device having access to the Internet.

The electronic device 100 may include power source, such as a battery 138, which may be one or more rechargeable batteries that may be charged, for example, through charging circuitry coupled to a battery interface such as the serial data port 152. The battery 138 may provide electrical power to at least some of the electrical circuitry in the electronic device 100, and the battery interface 136 may provide a mechanical and electrical connection for the battery 138. The battery interface 136 may be coupled to a regulator (not shown) which may provide power V+ to the circuitry of the electronic device 100.

A received signal, such as a text message, an e-mail message, or web page download, may be processed by the communication subsystem 104 and provided as input to the processor 102. The processor 102 may process the received signal for output, for example as output to the display 112 and/or to the auxiliary I/O subsystem 150. A subscriber may generate data items, for example e-mail messages, which may be transmitted over the wireless network 101 through the communication subsystem 104, for example.

The motion sensor 180 may comprise an accelerometer (such as a three-axis accelerometer) or other suitable motion sensor. The orientation sensor 182 may comprise an accelerometer (such as a three-axis accelerometer), electronic compass, gyroscope, or a combination thereof. Other suitable orientation sensors could be used instead of, or in addition to, the accelerometer, electronic compass and/or gyroscope. The motion sensor 180 and orientation sensor 182, or parts thereof, may be combined or shared, for example, within an integrated component. The processor 102, or controller (not shown) of a three-axis accelerometer, may convert acceleration measurements into device orientations.

The electronic device 100 may connect to a host personal computer (not shown) via the serial data port 152 or short-range communication subsystem 162 communicating over a suitable interconnection, such as a USB connection, Firewire™ connection, Bluetooth™ connection or the like.

The image capture assembly 200 of the electronic device 100 will be described in more detail with reference to FIG. 2. The image capture assembly 200 may include an image processor 202 which may perform various image processing functions, such as those described below. The image processor 202 may be a programmable image processor but could be, for example, a hard-wired custom integrated circuit (IC) processor, a general purpose microprocessor, or a combination of hard-wired custom IC and programmable processors. When the image capture assembly 200 is part of a multipurpose portable electronic device such as a mobile phone, smartphone or superphone, at least some of the functions of the image capture assembly 200 may be performed by the main processor 102 of the host electronic device 100. In some examples, all of the functions performed by the image processor 202 may be performed by the main processor 102, in which case the image processor 202 may be omitted. Furthermore, the image capture assembly 200 may have access to various components of the host electronic device 100, and may receive inputs from and send outputs to various components of the host electronic device 100, the input devices 105, motion sensor 180, orientation sensor 182, GPS 184, RAM 108, persistent memory 120 and the like.

The image capture assembly 200 may include a zoom lens 204 including a mechanical assembly of lens elements which may be connected to and controlled by a focus adjuster 206, such as zoom and focus motors (e.g., servo motors), which may adjust the focal length and focus distance of the zoom lens 204. The focus adjuster 206 may be coupled to the image processor 202 which may send zoom and focus signals to the focus adjuster 206 during zoom and focus operations. The zoom lens 204 may have a variable aperture the size of which may be expressed by an f-number (sometimes called focal ratio, f-ratio, f-stop, or relative aperture) which is a measure of the diameter of the aperture of the zoom lens 204. The f-number is defined as the focal length divided by the "effective" aperture diameter. The f-number is a dimensionless number that may be interpreted as a quantitative measure of lens "speed".

The zoom lens 204 may provide an image to an image sensor 208. The image sensor 208 may have one or more aspect ratios, such as a 4:3 and 16:9 image aspect ratios, and one or more image resolutions. In some embodiments, the image sensor 208 may be a charge-coupled device (CCD) sensor; however, a complementary metal-oxide semiconductor (CMOS) sensor or other suitable image sensor could be used. An adjustable aperture and shutter assembly (not shown) in the zoom lens 204 may be used to control the aperture size and the exposure time of the image sensor 208. In other embodiments, the zoom lens 204 may be replaced with a fixed focal length lens (also known as a "prime" lens) in which case the focus adjuster 206 may merely adjust the focus distance of the lens. Digital zoom may be provided by digital image processing, which may be performed by the image processor 202 of the image capture assembly 200 or processor 102 (rather than optical zoom provided by the zoom lens 204). In other embodiments, the shutter assembly could be omitted in favor of an electronic shutter, for example.

The image processor 202 may control the image sensor 208 by supplying various control signals to the image sensor 208. The image processor 202 may also control the focus adjuster 206, an exposure detector 222 which may determine the amount of available light, and/or a flash 224 for emitting light to illuminate a scene being captured by the focus lens 204. The input device(s) 105 may provide user controls for controlling the operation of the image capture assembly 200. The image processor 202 can use the input from the exposure detector 222 to determine the exposure time required to capture an image based on, for example, the amount of available light and other settings. The image processor 202 can activate the flash 224 to increase the amount of available light, for example, in response to the input from the exposure detector 222.

An analog captured image signal A output from the image sensor 208 may be amplified and converted to a digital captured image signal by an analog signal processor (ASP) 210. The ASP 210 may include an analog-to-digital (A/D) converter among other functional components. A digital captured image signal B output by the ASP 210 may be temporarily stored in a buffer memory 212, such as a Dynamic random-access memory (DRAM) buffer memory.

The image processor 202 may produce focus signals which may drive the focus adjuster 206 (e.g., zoom and focus motors) to adjust the focus of an image captured by the image sensor 208 and output as the captured image signal. The image processor 202 may produce focus signals in response to the activation of the capture button. A digital captured image signal C output by the ASP 210 may be provided to the image processor 202 which may perform autofocus calculations on the digital captured image signal C. Focus signals may be sent to the focus adjuster 206 to adjust the focus distance of the zoom lens 204 as necessary as a result of the output the autofocus calculations. The autofocus calculations may be performed using contrast detection or phase detection methods which may rely on moving the zoom lens 204 to make minor adjustments in the focus distance until a maximal (or optimal) contrast is obtained. In some examples, the autofocus calculations may assume that maximal (or optimal) contrast corresponds to maximal sharpness. The nature of the autofocus calculations is outside the scope of the present disclosure and will not be described in further detail herein. Other autofocus methods and calculations suitable for use by the image processor 202 may be possible.

The digital captured image signal C may also be output to the display 112 to provide a preview image. The digital captured image signal C may be used to provide a real-time or "live" preview in which a real-time image (or an approximation of an image) of the image captured with the image sensor 208 may be displayed on the display 112 as a thumbnail image (e.g., a reduced size/resolution version) of the captured image (e.g., for graphical processing efficiency), or on a dedicated electronic viewfinder device, for example.

A digital captured image signal D provided by the buffer memory 212 may be subsequently processed by the image processor 202 to produce a processed digital image file, which may contain a still digital image or a video image, for example.

The image processor 202 may perform various other image processing functions, including, for example, color interpolation and/or color and tone correction to produce rendered image data, such as standard Red Green Blue (sRGB) image data. The rendered image data may be stored in a memory, such as in the removable memory card 132 and/or the persistent memory 120. In some embodiments, the rendered image data may be compressed before storing, for example, the rendered image data may be JPEG compressed and stored as a JPEG image file, which may be in the Exchangeable image file (Exif) format or other suitable format, and which may support image metadata, such as one or more of a date/time the image was captured, f-number of the zoom lens 204 at which the image was captured, GPS location and pointing direction when the image was captured, and possibly other information such as other camera settings.

The processing performed by the image processor 202 may be controlled by firmware stored in a firmware memory (not shown), which may be flash memory or any other suitable form of memory. The image processor 202 may process the digital input image from the buffer memory 212, using RAM memory (such as RAM 108 of the host electronic device or possibly separate, dedicated RAM) to store intermediate results during processing.

Figure 2:
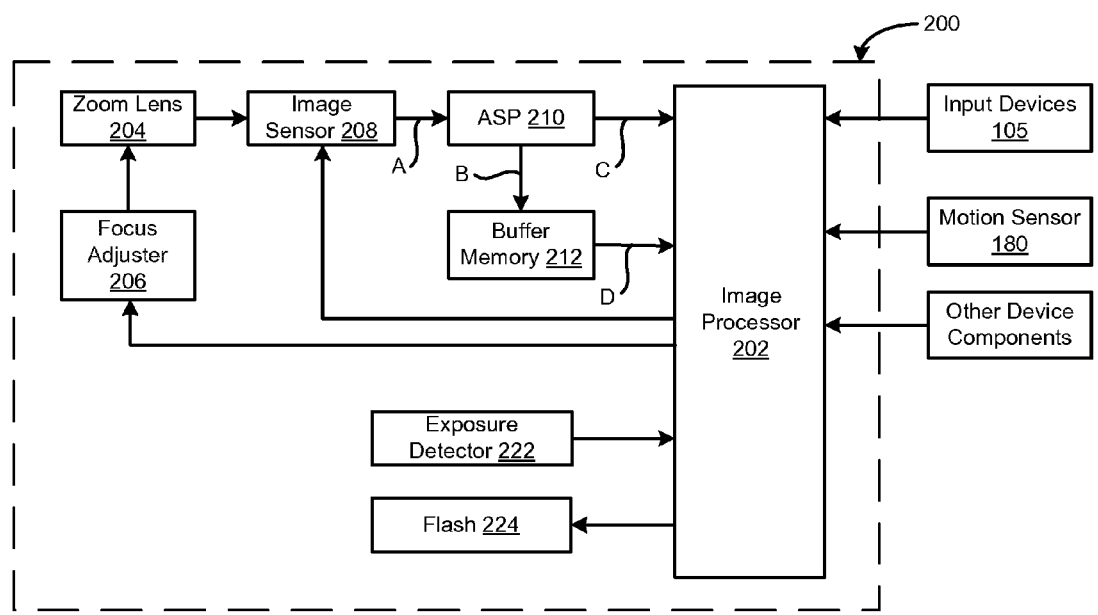
FIG. 2 is a block diagram illustrating an image capture assembly of the portable electronic device of FIG. 1.

While the components of the electronic device 100 are shown as separate blocks in FIGS. 1 and 2, two or more functions of various components may be combined in actual processing elements, circuits and the like. Furthermore, one or more of the functional blocks of FIGS. 1 and 2 may be separated into one or more sub blocks when implemented in actual processing elements, circuits and the like.

Figure 3:
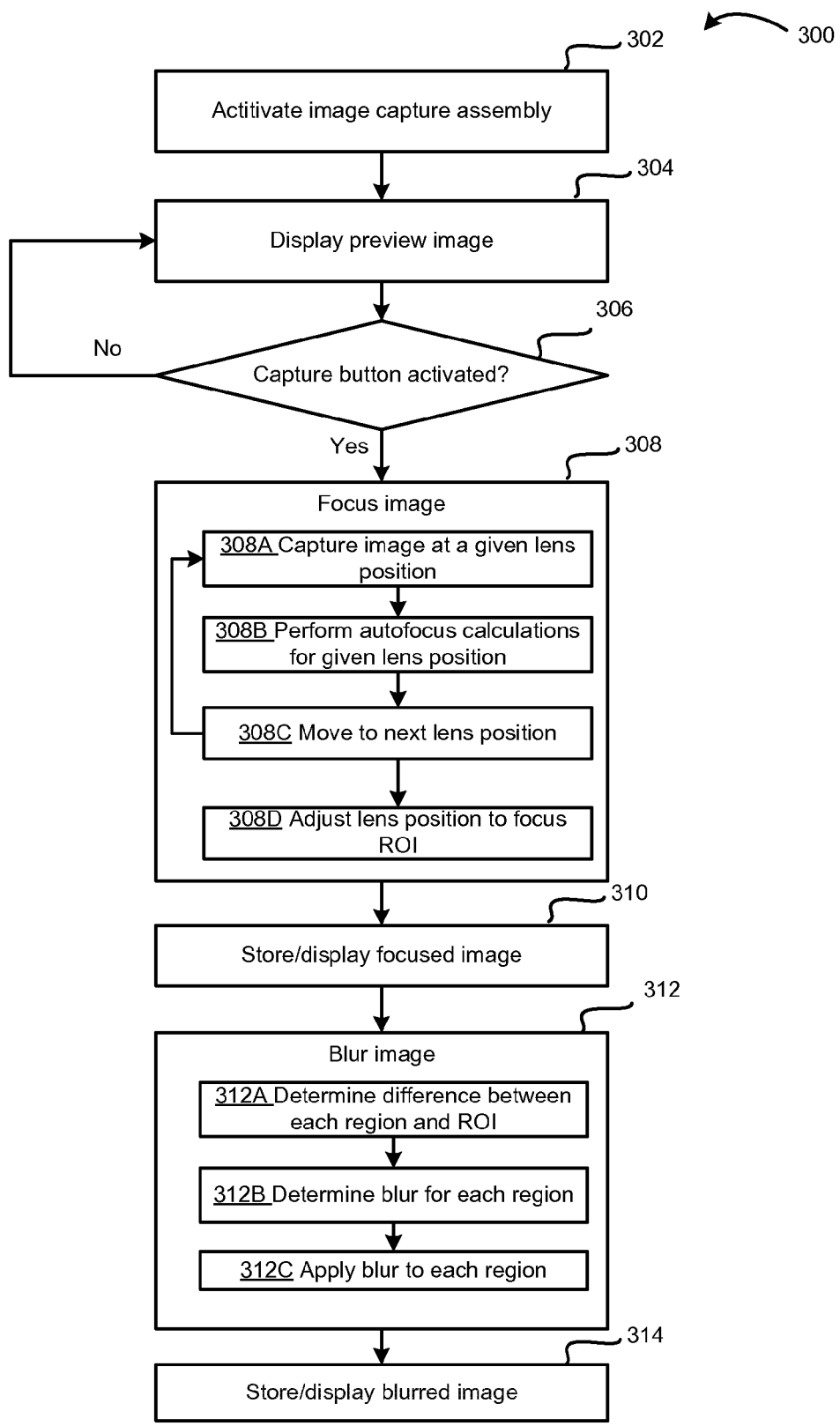
FIG. 3 is a flowchart illustrating an example method for generating a shallow depth of field effect.

FIG. 3 is a flowchart of an example method 300 for generating a shallow depth of field effect. The method 300 may be carried out, at least in part, by firmware or software such as the camera application 181, executed by the processor 102 and/or image processor 202. Coding of software for carrying out such a method 300 is within the scope of a person of ordinary skill in the art provided the present disclosure. The method 300 may contain additional or fewer processes than shown and/or described, and may be performed in a different order. Computer-readable code executable by at least one processor 102 and/or image processor 202 to perform the method 300 may be stored in a non-transient computer-readable medium such as the persistent memory 120, a removable memory, or other storage medium (e.g., DVD, CD or hard drive).

At 302, the image capture assembly 200 may be activated, for example, by engaging a camera mode of the electronic device 100. The camera mode can be activated, for example, by activation of a camera button or selection of a corresponding menu option displayed on the display 112. The zoom lens 204 may be set to a default position which may be a wide angle position.

At 304, the image sensor 208 may capture one or more images which may be output to the display 112 to provide an image preview mode. The image preview mode may enable the user to compose the image(s) to be captured based on a real-time preview image. The digital captured image signal C may provide captured image(s) for preview on the display 112. As part of the composing, the user may, for example, activate a zoom button to set a desired field of view. A dedicated electronic viewfinder device may also be provided for the display of the real-time preview image.

At 306, the electronic device 100 may monitor for and detect when the capture button is or has been activated.

At 308, when the electronic device 100 detects that the capture button is or has been activated, focusing of the captured image may be performed. In some examples, focusing of the image may be performed in response to activation of a focus button. The digital captured image signal C may provide captured image(s) for the image processor 202 to perform autofocus calculations as well as providing captured image(s) for preview on the display 112, as mentioned previously.

As part of the focusing, at 308A the image processor 202 may store a captured image (e.g., the captured image may be temporarily stored in the buffer memory 212) with the lens at a given lens position. The captured image may be an initial image captured by the image sensor 208 that may require focusing and may not be the final image presented to the user.

At 308B, the image processor 202 may analyze the digital captured image signal C using autofocus calculations (e.g., contrast maximization). These autofocus calculations may include calculating a focus score for different portions of the captured image. The focus score for a given image portion may be a metric that is indicative of how focused (e.g., higher contrast and/or more defined edges) the image is in that portion. The image may be divided into portions for analysis according to various suitable approaches (e.g., by dividing the image into equal or unequal blocks, such as a grid), according to user settings (e.g., where the user has preset a panoramic mode, the sides of the image may be assumed to be background and be analyzed together as a single image portion) and/or based on individual pixels of the sensor 208 (e.g., where the image is divided into portions corresponding to individual pixels of the image sensor 208). The focus scores of each image portion, for the image captured at the given lens position, may be stored (e.g., in the buffer memory 212) for further use.

At 308C, the lens may be moved to another lens position, such as the next stepwise lens position available for the electronic device 100. The method 300 may return to 308A and 308B to capture and analyze an image captured at this next lens position. When all lens positions have been analyzed or when sufficient analysis has been performed, the method 300 may proceed to 308D.

At 308D, the optimal lens position for focusing the region of interest (ROI) of the image may be determined and the lens position may be adjusted accordingly. The optimal lens position for the ROI may be defined as the lens position in which object(s) in the ROI is (are) most in focus. Although the term "optimal" is used, the optimal lens position need not be strictly the optimal or optimized position for the lens, but may merely be the preferred or improved lens position.

To determine the optimal lens position for the ROI, the focus scores for the ROI at each lens position may be compared. The lens position at which the focus score for the ROI is best (in some examples, a higher focus score may indicate better focus in which case the highest focus score may be best; conversely in some examples a lower focus score may indicate better focus in which case the lowest focus score may be best) may be determined to be the optimal lens position for the ROI. Similarly, the optimal lens position for each non-interest region may also be determined.

Figure 4:
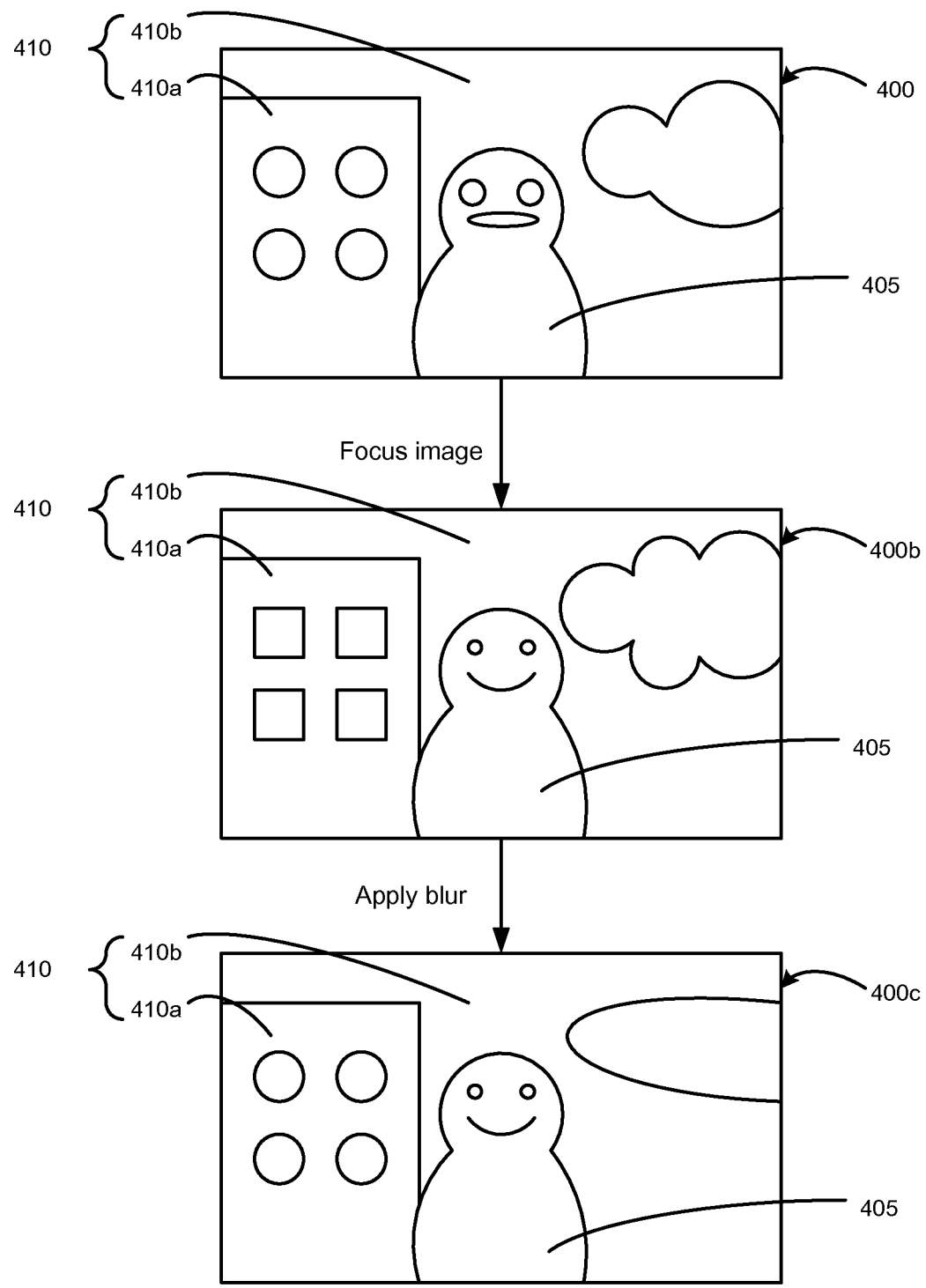
FIG. 4 is a diagram illustrating the example method of FIG. 3 being applied to an example image.

FIG. 4 illustrates an example captured image 400 that may include a region of interest (ROI) 405. The ROI 405 may correspond to object(s) and/or person(s), for example, for which optimal focus is desired. The ROI 405 may be determined automatically, such as the region corresponding to object(s) located at or near the center of the image, or by executing a face detection algorithm or other similar functionality in the camera application 181. In some examples, the ROI 405 may be user-selected (e.g., by a user using a suitable GUI, such as positioning of a crosshair). The image 400 may also include one or more other non-interest regions 410 such as one or more mid-ground regions 410a and one or more background regions 410b. In some examples, one or more foreground regions may be included as a non-interest region 410 (e.g., where the ROI 405 corresponds to a mid-ground object). In general, there may be multiple regions defined for an image, including at least one ROI 405 and one or more non-interest regions 410. In some examples, the number of defined regions 405, 410 may be as many as the number of lens positions available for the electronic device 100.

The ROI 405 and non-interest region(s) 410 may correspond to object(s) at different distances to the image sensor 208 and may thus be focused to different degrees in the captured image 400. The focus score and optimal lens position for each of the regions 405, 410 may thus be different. Regions 405, 410 may be automatically defined by the processor 102 and/or the image processor 202 using the autofocus calculations. For example, portions of the image having the same or similar optimal lens position (or falling within the same range of optimal lens position) may be defined as belonging to the same region 405, 410 (in some examples, this may result in additional portions of the image being added to the ROI 405). Each of the regions 405, 410 may be contiguous or may comprise two or more discrete portions of the image, for example. Thus, a region 405, 410 may comprise one or more of the image portions analyzed in 308B.

After the optimal lens position for the ROI 405 has been determined, appropriate focus signals may be provided to the focus adjuster 206 in order move the zoom lens 204 to the optimal lens position for the ROI, in order to adjust the focus of the image.

The process of 308 (including 308A-308D) may take place in response to a single activation of the capture button and/or a single activation of the focus button.

Returning now to FIG. 3, at 310, a focused image 400b may be captured and stored in a memory, such as in the removable memory card 132 and/or the persistent memory 120, and optionally displayed on the display 112. Any captured image other than the focused image 400b (e.g., other images captured at 308A) may also be stored in a memory, such as in the removable memory card 132 and/or the persistent memory 120, or may be discarded. Information determined during the autofocus calculations may be stored (e.g., as metadata) in association with the focused image 400b. For example, information defining different regions 405, 410 of the focused image 400b and the respective optimal lens position for each region 405, 410 may be stored as metadata associated with the captured image 400 and/or the focused image 400b.

At 312, blurring may be applied to the focused image 400b in order to generate a shallow depth of field effect, also referred to as a "Bokeh" effect. In some examples, the blurring or Bokeh effect may be applied automatically by the processor 102 and/or the image processor 202, for example where the user has preset preferences or instructions (which may be preset in a user profile, for example or set by the user ahead of each captured image, such as by selecting a Bokeh menu option displayed in a GUI on the display 112) to apply a Bokeh effect. Where the Bokeh effect is applied automatically by the processor 102 and/or the image processor 202, the focused image 400b may not be stored and/or displayed at 310 (step 310 may be entirely optional in such a case) but instead a blurred image 400c may be stored and/or displayed at 314 (described further below) after suitable blurring has been applied to the focused image 400b. In some examples, blurring may be applied to the focused image 400b after a user selects application of a Bokeh effect to the focused image 400b (e.g., by selecting a Bokeh menu option displayed in a GUI on the display 112). In such a situation, the focused image 400b may be displayed at 310 and, after applying blurring, display of the focused image 400b may be replaced by display of the blurred image 400c at 314.

Applying the Bokeh effect may include, at 312A, determining a difference in focus or object distance between the ROI 405 and each other non-interest region 410 of the focused image 400b (e.g., by retrieving such information from memory, such as the removable memory card 132 and/or the persistent memory 120). For example, where the optimal lens position is stored as metadata, a lens position difference may be calculated for each non-interest region 410, where the lens position difference is the difference between the optimal lens position for the ROI 405 and the optimal lens position for the non-interest region 410. Other information (e.g., focus score or actual detected object distance) may be used to determine the difference in focus or object distance between the ROI 405 and each non-interest region 410.

At 312B, the amount of blurring to be applied to each non-interest region 410 may be determined. The greater the difference in focus or object distance (e.g., as indicated by the lens position difference) between the optimal lens position for the ROI 405 and that of a given non-interest region 410, the greater the amount of blurring that may be applied to that given non-interest region 410. For example, the lens position difference between the optimal lens position for the ROI 405 and that of a mid-ground region 410a may be less than the lens position difference between the optimal lens position for the ROI 405 and that of a background region 410b, in which case it may be determined that more blurring should be applied to the background region 410b than to the mid-ground region 410a. By applying different amounts of blurring to different non-interest regions 410, based on the difference in focus or object distance between each non-interest region 410 and the ROI 405, a more natural Bokeh effect may be achieved, which may more closely approximate a natural shallow depth of field.

In some examples, the amount of blurring for different non-interest regions 410 may also be determined based on user selection. For example, after viewing the focused image 400b or the blurred image 400c, the user may select (e.g., using a GUI provided on the display 112) a degree of blurring to be applied. The blurring of the blurred image 400c may be increased or decreased in response to the selection. For example, the user may select an overall increase (or decrease) in blurring, and the blurring of the non-interest regions 410 may be accordingly increased (or decreased). Where the non-interest regions 410 have different object distances to the ROI 405 (e.g., as indicated by different lens position differences being calculated for each non-interest region 410), blurring of the non-interest regions 410 may be increased (or decreased) by different amounts (e.g., proportionally or non-linearly) based on the respective calculated difference in focus or object distance between each non-interest region 410 and the ROI 405 (e.g., as indicated by the lens position difference). Since information defining the regions 405, 410 of the image and corresponding optimal lens position information for each region 405, 410 are stored, the user may also be provided with the ability to select different degrees of blurring for the different non-interest region(s) 410 of the image. In some examples, the user may also be provided with the ability to blur the ROI 405, similarly to that described above for blurring of non-interest region(s) 410.

At 312C, blurring may be applied to each non-interest region 410 according to the amount determined at 312B, in order to generate the blurred image 400c.

Blurring of non-interest region(s) 410 of the image may be carried out using suitable image processing techniques. For example, non-interest region(s) 410 may be convolved with a uniform disk or other kernel to emulate a natural shallow depth of field effect, a Gaussian blur may be applied to the non-interest regions 410, or other Bokeh emulation techniques may be used. By varying the blurring technique (e.g., changing the kernel used or increasing the amount of convolution), different amounts of blurring may be achieved for different non-interest region(s) 410.

At 314, the blurred image 400c may be stored in memory, such as in the removable memory card 132 and/or the persistent memory 120, and optionally displayed on the display 112. The blurred image 400c may be stored in addition to the focused image 400b, or may replace the focused image 400b in memory.

In some examples, such as where the user is provided with an option to manually select a desired amount and/or type of blurring to be applied, a Bokeh effect may be applied again to an already blurred image 400c, for example by repeating 312 and 314 as described above. Since information about the relative focus or object distance for each region 405, 410 may be maintained in memory (e.g., as metadata associated with the blurred image 400c), different amounts of additional Bokeh effect may be applied to different non-interest region(s) 410, as described above. Where the focused image 400b is also stored and associated with the blurred image 400c, it may be possible for the Bokeh effect that is applied at 312 to be removed or decreased (e.g., based on a user's manual selection). In general, where blurring is re-applied to a first already blurred image, the result may be a second blurred image that has more, less or substantially the same amount of blurring as the first blurred image.

Although the disclosed examples describe the mid-ground and background regions 410a, 410b as examples of non-interest regions 410 to be blurred, in other cases the non-interest region(s) 410 to be blurred may include a foreground region (e.g., where the ROI 405 corresponds to object(s) at a mid- or long-distance from the image sensor 208), or any image region that may be defined (e.g., based on autofocus calculations, as described above). In general, the term region of interest or ROI may be used to refer to region(s) in the image to which the Bokeh effect is (are) not applied, while the term non-interest region may be used to refer to region(s) in the image to which the Bokeh effect is (are) applied.

The present disclosure may provide a way to emulate a shallow depth of field effect in a digitally captured image, which may more closely approximate a natural shallow depth of field effect. The present disclosure may also provide a way to achieve a shallow depth of field effect immediately upon capture of an image and/or later after capture of the image (e.g., in response to user selection).

The steps and/or operations in the flowcharts and drawings described herein are for purposes of example only. Variations to these steps and/or operations may be possible within the scope of the present disclosure. For instance, the steps may be performed in a differing order, or steps may be added, deleted, or modified.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar non-transient computer readable medium including program instructions stored thereon for performing the methods described herein, including DVDs, CDs, volatile or non-volatile memories, or other storage media, for example.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure. The present disclosure intends to cover and embrace all suitable changes in technology. All references mentioned are hereby incorporated by reference.

The invention claimed is:

1. A method for generating a shallow depth of field effect for a digitally captured image, at least one region of interest and at least one non-interest region being defined in the captured image, the method comprising:

retrieving a previously stored captured image from a memory, metadata having been stored with the captured image, the metadata containing focus information for each of the at least one region of interest and the at least one non-interest region;

calculating, for each non-interest region, a difference in focus between the at least one region of interest and the non-interest region using the focus information contained in the metadata;

determining, for each non-interest region, a degree of blur to be applied to the non-interest region, based on the calculated difference in focus;

applying the determined degree of blur to each non-interest region, to generate a blurred image; and displaying the blurred image on a display.

2. The method of claim 1, wherein at least two non-interest regions are defined in the captured image, the calculated difference for a first non-interest region being greater than the calculated difference for a second non-interest region, wherein the determined degree of blur is greater for the first non-interest region than for the second non-interest region.

3. The method of claim 1, wherein determining the degree of blur to be applied comprises determining the degree of blur based on a pre-selected desired amount of blurring.

4. The method of claim 1, further comprising, after generating a first blurred image:

receiving a selection of a desired amount of blurring;

further blurring each non-interest region according to the selected desired amount of blurring and the respective calculated difference in focus, to generate a second blurred image; and displaying the second blurred image on the display.

5. The method of claim 1, wherein the focus information includes at least one of:

respective optimal lens positions for each of the at least one region of interest and the at least one non-interest region; and respective focus scores for each of the at least one region of interest and the at least one non-interest region.

6. The method of claim 5, wherein the focus information includes respective optimal lens positions, and wherein the calculated difference in focus is calculated as a difference in optimal lens position for each region.

7. The method of claim 6, wherein the calculated optimal lens position of each region is calculated as part of an autofocus method.

8. The method of claim 1, wherein the metadata contains region definition information defining the at least one region of interest and the at least one non-interest region.

9. An electronic device for generating a shallow depth of field effect for a digitally captured image, at least one region of interest and at least one non-interest region being defined in the captured image, the electronic device comprising:

a processor configured to execute computer-readable instructions to cause the electronic device to:

retrieve a previously stored captured image from a memory, metadata having been stored with the captured image, the metadata containing focus information for each of the at least one region of interest and the at least one non-interest region;

calculate, for each non-interest region, a difference in focus between the at least one region of interest and the non-interest region using the focus information contained in the metadata;

determine, for each non-interest region, a degree of blur to be applied to the non-interest region, based on the calculated difference in focus;

apply the determined degree of blur to each non-interest region, to generate a blurred image; and display the blurred image on a display.

10. The electronic device of claim 9, wherein at least two non-interest regions are defined in the captured image, the calculated difference for a first non-interest region being greater than the calculated difference for a second non-interest region, wherein the determined degree of blur is greater for the first non-interest region than for the second non-interest region.

11. The electronic device of claim 9, wherein determining the degree of blur to be applied comprises determining the degree of blur based on a pre-selected desired amount of blurring.

12. The electronic device of claim 9, wherein, after generating a first blurred image, the computer-readable instructions further cause the electronic device to:

receive a selection of a desired amount of blurring;

further blur each non-interest region according to the selected desired amount of blurring and the respective calculated difference in focus, to generate a second blurred image; and display the second blurred image on the display.

13. The electronic device of claim 9, wherein the focus information includes respective optimal lens positions for each of the at least one region of interest and the at least one non-interest region, and wherein the calculated difference in focus is calculated as a difference in optimal lens position for each region.

14. The electronic device of claim 13, wherein the calculated optimal lens position of each region is calculated as part of an autofocus method.

15. A non-transient computer readable medium for generating a shallow depth of field effect for a digitally captured image, at least one region of interest and at least one non-interest region being defined in the captured image, the computer readable medium storing computer-readable instructions that are executable to cause an electronic device to:

retrieve a previously stored captured image from a memory, metadata having been stored with the captured image, the metadata containing focus information for each of the at least one region of interest and the at least one non-interest region;

calculate, for each non-interest region, a difference in focus between the at least one region of interest and the non-interest region using the focus information contained in the metadata;

determine, for each non-interest region, a degree of blur to be applied to the non-interest region, based on the calculated difference in focus;

apply the determined degree of blur to each non-interest region, to generate a blurred image; and display the blurred image on a display.

16. The computer readable medium of claim 15, wherein at least two non-interest regions are defined in the captured image, the calculated difference for a first non-interest region being greater than the calculated difference for a second non-interest region, wherein the determined degree of blur is greater for the first non-interest region than for the second non-interest region.

17. The computer readable medium of claim 15, wherein determining the degree of blur to be applied comprises determining the degree of blur based on a pre-selected desired amount of blurring.

18. The computer readable medium of claim 15, wherein, after generating a first blurred image, the computer-readable instructions further cause the electronic device to:
- receive a selection of a desired amount of blurring;
- further blur each non-interest region according to the selected desired amount of blurring and the respective calculated difference in focus, to generate a second blurred image; and
- display the second blurred image on the display.

19. The computer readable medium of claim 15, wherein the focus information includes respective optimal lens positions for each of the at least one region of interest and the at least one non-interest region, and wherein the calculated difference in focus is calculated as a difference in optimal lens position for each region.

20. The computer readable medium of claim 19, wherein the calculated optimal lens position of each region is calculated as part of an autofocus method.

* * * * *